United States Patent [19]

Roloff

[11] Patent Number: 4,696,690

[45] Date of Patent: Sep. 29, 1987

[54] METHOD AND DEVICE FOR PREHEATING RAW MATERIALS FOR GLASS PRODUCTION, PARTICULARLY A CULLET MIXTURE

[75] Inventor: Helmut Roloff, Neinburg, Fed. Rep. of Germany

[73] Assignee: Himly, Holscher GmbH & Co., Nienburg, Fed. Rep. of Germany

[21] Appl. No.: 826,953

[22] Filed: Feb. 7, 1986

[51] Int. Cl.$^4$ ............................................... C03B 1/00
[52] U.S. Cl. ..................................... 65/27; 34/57 A;
55/223; 55/228; 65/335; 165/104.15; 165/920; 261/90; 261/117
[58] Field of Search .................... 65/27, 335; 165/920, 165/104.15; 34/57 A; 261/90, 117; 55/223, 228

[56] References Cited

U.S. PATENT DOCUMENTS

| 2,142,406 | 1/1939 | Nonhebel et al. | 55/228 |
| 2,179,848 | 11/1939 | Forter | 65/335 X |
| 2,736,390 | 2/1956 | Wickland | 261/90 X |
| 2,958,161 | 11/1960 | Palmer | 65/134 |
| 3,728,094 | 4/1973 | Bowman | 65/27 |
| 3,842,516 | 10/1974 | Speissegger et al. | 34/57 A X |
| 3,953,190 | 4/1976 | Lange | 34/57 A X |
| 4,164,399 | 8/1979 | Kannapell | 55/223 |
| 4,410,347 | 10/1983 | Krumwiede | 65/27 |

Primary Examiner—Arthur Kellogg
Attorney, Agent, or Firm—Sughrue, Mion, Zinn, Macpeak and Seas

[57] ABSTRACT

In glass production, waste gases are usually produced which still have a residual temperature of 400°–600° C. even though they are normally used for preheating the fresh air for a glass melting furnace. To be able to utilize this residual energy effectively for the preheating of the raw materials for glass production, particularly cullet, the invention proposes to conduct the waste gases through a bunker (19) for the temporary storage of cullet (20) and to heat the cullet mixture (20) to up to 380° C. during this process. According to a proposal of the invention, the cooled waste gases contaminated during the preheating of the cullet mixture (20) are conducted via a wet scrubber (26) before they are returned to the waste-gas duct (17) leading to the chimney or similar.

20 Claims, 6 Drawing Figures

METHOD AND DEVICE FOR PREHEATING RAW MATERIALS FOR GLASS PRODUCTION, PARTICULARLY A CULLET MIXTURE

The invention relates to a method for preheating raw materials for glass production, particularly a cullet mixture, in accordance with the pre-characterizing clause of claim 1. In addition, the invention is related to a device, used in particular for carrying out the method according to the invention, in accordance with the pre-characterizing clause of claim 14.

The process of glass production, particularly the heating of the required raw materials or cullet for forming a glass melt, is very energy-intensive. A considerable proportion of the necessary energy is lost due to the fact that the waste gases created during the combustion still have a temperature of about 1400° C. Although it is known to conduct the waste gases through a heat exchanger and by this means to preheat the fresh combustion air, which is at ambient temperature, only a partial cooling of the waste gases is possible with this type of fresh-air preheating for thermodynamic reasons. The unused combustion waste gases to be conducted into the chimney thus still have a final temperature of 400°–600° C. This means that 25% of the fuel energy used hitherto remains unused, that is to say is lost.

Independently of the heating of the glass melting furnace, further energy is required in glass production due to the conventional preheating of the raw materials, particularly of the cullet mixture which can amount to up to 90% of the raw-material content in glass production. Here, too, a residual waste gas heat is usually lost.

The invention is based on the object of creating a method and a device by means of which a preheating of the raw materials for glass production, preferably cullet, is possible in a manner which saves energy and is harmless to the environment.

To achieve this object, the method according to the invention has certain novel characterizing features. In this connection, it is particularly suitable to conduct the waste gas through the cullet mixture in a bunker, through corresponding flow ducts in the bunker. Due to a continuous removal of the cullet mixture from the bunker, a slow downward flow of cullet is produced in the bunker. In this manner, the cullet is preheated during the entire time it flows through the bunker. Thus, an intensive preheating of the bunker contents by utilizing the (residual) heat of the waste gases is possible by this method.

It is advantageous to conduct the waste gases in counter flow through the cullet mixture in the bunker, which makes it possible for the waste gas, which enters the bunker with a temperature which is still high, to continue to heat the cullet effectively which has already been partially preheated, while in the upper area of the bunker, the partially cooled waste gas slowly heats the cullet entering there, which is still cold.

The waste gases emerging from the glass melting furnace can be considered for preheating the cullet in the bunker. In an advantageous method of the invention, however, the waste gases are not directly conducted from the glass melting furnace into the bunker for preheating but first through a heat exchanger for preheating the cold fresh air conducted to the glass melting furnace. As a result, the waste gases already used for preheating the fresh air only have a remaining residual heat of 600°–400° C. This is sufficient for preheating the cullet mixture in the bunker to up to 380° C., during which process the waste gases are cooled to a temperature of less than 100° C. when they leave the preheating bunker. Thus, the waste gases are cooled almost down to room temperature after the cullet preheating, that is to say the heat energy contained in the waste gase has been largely utilized for preheating the cullet.

Should the residual heat not be adequate for the intended preheating of the cullet in the bunker after the waste gases have passed through the heat exchanger for heating up the fresh air, the invention provides for waste gas coming directly from the melting end of the glass melting furnace at a temperature of up to 1400° C. to be added to the partially cooled waste gas. As a result, the preheating of the cullet can be effectively regulated to an intended temperature.

During the preheating of the cullet, the waste gases are contaminated by substances adhering to the cullet. For this reason, the cold waste gases must be cleaned for reasons of emission protection before they are passed to the environment. Since, from experience, this cannot be done by means of the conventional cleaning of the hotter waste gases which are not needed for preheating the cullet, the invention provides a separate method for this purpose. According to this method, the cold waste gases coming from the preheating bunker are conducted through a wet scrubber in which they are sprayed with a washing fluid, preferably also by the counter flow method. In this process, solids are precipitated from the waste gas, on the on hand, and, on the other hand, gaseous pollutants, for example sulfur and/or nitrogen/oxygen compounds are condensed. The condensates of pollutants thus produced are mixed in with the wasing fluid. To remove them from the latter, it is also proposed in accordance with the method to add a neutralizing agent, for example milk of lime and/or ammonia to the washing fluid in a collecting tank. This neutralizes the sulfuric acid or sulfurous acid and promotes the bonding of nitrogen oxide compounds. The neutralization precipitation sludge is decanted and drained in the collecting tank which can be constructed, for example, as a baffle-type separator. It is possible in this manner to conduct the scrubbing water in the wet separator in a closed circuit because the washing water, which is enriched with impurities during the waste gas purification, is continuously regenerated before it is again brought into contact with the waste gas. The waste gas, too, can be returned to the waste gas duct since the accumulations of pollutants during the preheating of the cullet have essentially been removed from it in the wet scrubber.

Finally, according to a further proposal of a method of the invention, the cleaning process in the wet scrubber is improved by the fact that one or more elements are provided in the latter which intensify the mixing of the washing fluid with the contaminated waste gases. Moving disintegrators in the wet scrubber can be used as such elements. This ensures that, on the one hand, it is always clean treated washing fluid which is conducted into the wet scrubber for improving the efficiency of the waste-gas purification process and, on the other hand, the waste gas returns to the waste-gas duct as comprehensively treated as possible. As a result, the method according to the invention operates in a manner which produces extremely little pollution to the environment.

To achieve the object according to the invention, the device for carrying out this method has the characterizing features. The achievement of this solution is that waste gases flow through the cullet in the entire interior of the bunker, that is to say uniform preheating of the bunker contents is ensured.

Several horizontal duct levels consisting of a plurality of flow ducts extending parallel to each other are suitably arranged in the bunker. In this arrangement, the individual flow ducts are distributed on each duct level in such a manner that the flow ducts of adjacent duct levels are offset with respect to each other, that is to say the flow ducts are staggered. In this manner, the waste-gas flow set up in the interior of the bunker is homogeneous over the entire bunker cross-section. As a result, the broken-glass mixture is of necessity uniformly preheated without concentrations of increased preheating temperature of the cullet mixture forming in the bunker. This also prevents partial overheating of the cullet and baking-together of the latter.

It is also proposed to allocate a separate waste-gas supply and waste-gas removal line to each flow duct of the upper and lower duct level in the bunker. By joining all flows ducts to those of the adjoining duct levels, several vertical flow circuits are created for the waste gases in the bunker. This creates a sufficiently great throughout of waste gas through the bunker for effectively preheating the cullet mixture. To increase the waste-gas through-put through the bunker further, a blower, particularly a hot-air blower can be arranged in the waste-gas supply line to the bunker.

According to a further proposal of the invention, the flow ducts are composed of two halves. According to this proposal, an upper half of the flow duct is formed of a roof-like elongated structure built into the bunker. This structure can consist, for example, of an equal-sided angles section which is arranged between two parallel side walls of the bunker in such a manner that it is open to the bottom. These roof-shaped angle sections form an obstacle for the cullet mixture in the bunker. Of necessity, therefore, this mixture forms the second lower half of the flow ducts due to the cone of the loose cullet mixture forming below the angle sections. According to the invention, the flow ducts are thus produced with a minimum of constructional effort. In constrast to flow ducts which—which is also possible as an alternative—are formed of perforated pipes, the flow ducts partially formed by the cone of the loose cullet mixture can virtually not become blocked. In addition, they can be very easily cleaned because the angle sections are easily accessible from below when the bunker has been emptied. In addition, the flow ducts according to the invention provide a relatively large area of attack for the waste gases since, in principle, half the area, the lower area, of each flow duct is formed by the cullet mixture to be preheated. Due to the fact that the cullet mixture continuously flows in a slow flow from the top to the bottom through the bunker, it is always different cullet which forms a flow duct as a result of which the greatest proportion of the cullet comes directly into contact with the waste gas for a short time. The cullet of the lower half of each flow duct forms a rough wall which is permeable to gas and which provides a good turbulence of the waste gas in the flow duct and enables gas to flow between the cullet. As a result, the waste gas flow for preheating the cullet mixture is not only restricted to the flow ducts but also penetrate the cullet mixture located between several flow ducts. This, too, contributes to the improvement of a homogeneous preheating of the cullet mixture and to prevention of the baking together of individual bits of cullet.

The individual flow ducts in the bunker are joined together by overflow ducts through which the waste gas can flow from one duct level to the other. Preferably, each of the opposite ends of the flow ducts are associated with one overflow duct. As a result, the waste gas arriving from a lower duct level can flow up through an overflow duct into a higher duct level and there enter at an end into the flow ducts, flow through these and emerge again from the flow ducts at the opposite end to flow up into a next higher duct level. In this manner, the waste gas flows through the bunker following a trapezoidal course.

In a particularly advantageous illustrative embodiment, the overflow ducts are arranged in the interior of the bunker, at the ends facing the ends of the angle sections for the flow ducts. The overflow ducts arranged in this manner can be easily produced in accordance with a further proposal of the invention by mounting U-sections with their open side from the inside on the side walls. Alternatively, the overflow ducts can also be arranged outside the bunker by arranging appropriate openings for the waste gases in the bunker side walls and joining them to each other by appropriate pipes.

Other device-related features of the invention concern the construction of the wet scrubber, particularly of the disintegrators arranged in it.

In the text which follows, two illustrative embodiments of the invention are explained in greater detail with the aid of the drawing, in which.

Figure 1:
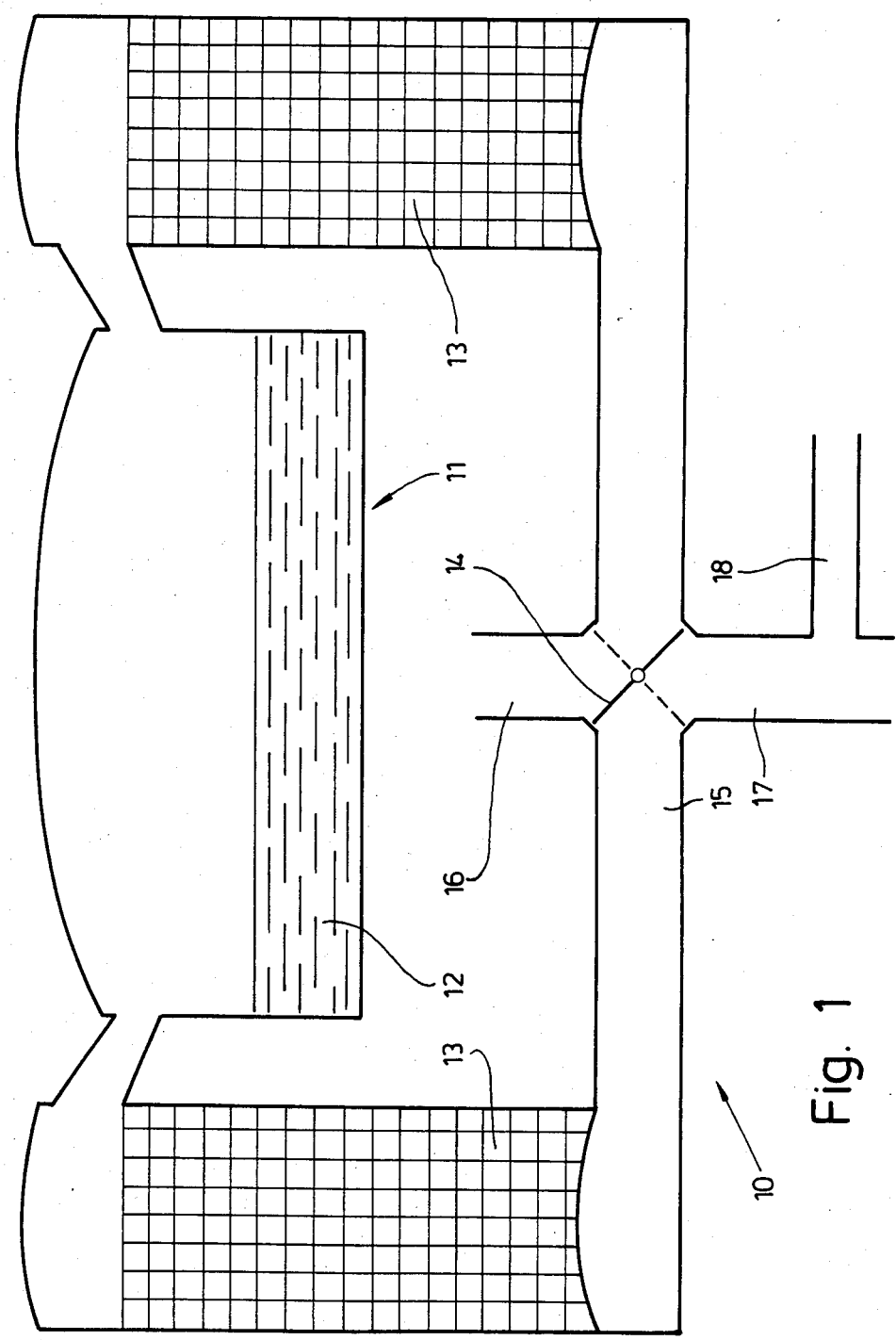
FIG. 1 shows a diagrammatic representation of a melting furnace, showing the course of a waste-gas line.

In the illustrative embodiments of the invention, described in the text which follows, the raw materials for glass production are preheated by the waste gases of a glass melting furnace 10 diagrammatically shown in FIG. 1. The glass melting furnace 10 is provided with a melting end 11 in which the glass melt 12 can be directly heated from above. In the arrangement shown, the melting end 11 is associated with two regenerators 13 through which alternately either the waste gas from the melting end 11 or fresh combustion air flows. During this process, in each case one of the two regenerators 13 is heated by the waste gas leaving the melting end 11 at about 1400° C., to such an extent that the waste gas only has a temperature of about 400°–600° C. downstream of the regenerator 13. While one of the regenerators 13 is being heated, the cold combustion air is preheated in the second regenerator 13 to about 1250° C. A rotatable control flap 14 in the supply lines 15 leading to the regenerators 13 is used for re-directing the gas supply or gas removal when the regenerators 13 are to be changed over from heating to preheating of the fresh air and conversely. For this purpose, a fresh-air supply line 16 and a waste-gas duct 17 open into the lower supply line 15 linking the regenerators 13. From the aforementioned waste-gas duct 17, a waste-gas supply line 18 branches off by means of which waste gases from the glass melting furnace 10, that is to say its melting end 11, are supplied to the raw materials for glass production to be preheated.

Figure 2:
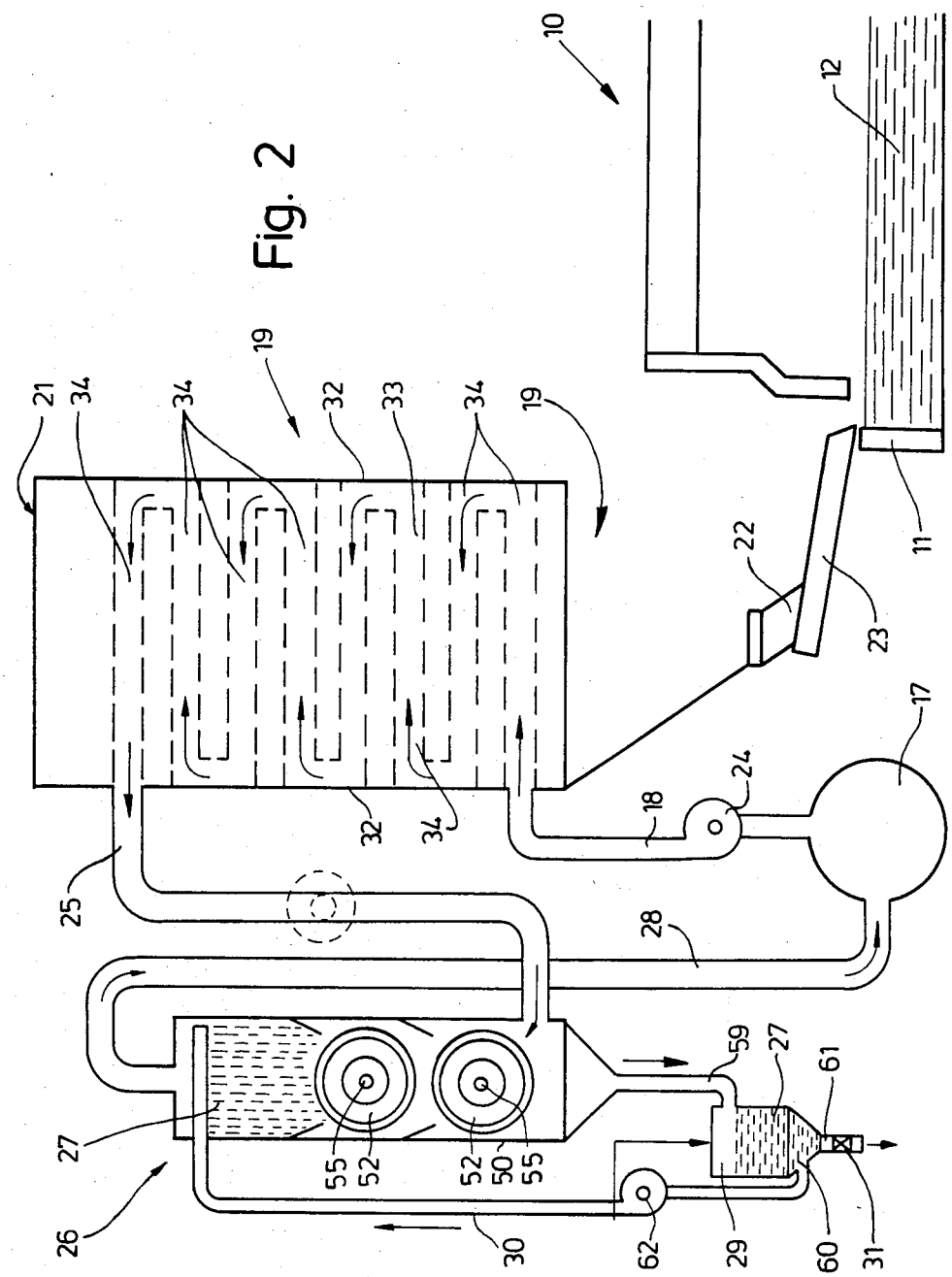
FIG. 2 shows a diagrammatic representation of a device for preheating a cullet mixture.

FIG. 2 shows a device according to the invention for preheating a cullet mixture 20 temporarily stored in a bunker 19. Such a cullet mixture 20, produced from broken old glass, is used as raw material for glass production. In this connection, the proportion of this cullet mixture 20 can be up to 90% of the total raw material. The cullet mixture 20 is continuously or intermittently supplied to the bunker 19 through an upper opening 21. The cullet mixture 20 can be preferably continuously removed from the bunker 19 through a lower outlet 22 and can be supplied to the melting end 11 via a vibrating trough 23 or similar continuous conveyor. This creates an almost continuous flow of the cullet mixture 20 from top to bottom in the bunker 19.

According to the invention, the cullet mixture 20 is preheated in the bunker 19. For this purpose, the waste-gas supply line 18 coming from the waste-gas duct 17 opens into a lower area of the bunker 19, a hot-air blower 24 for blowing the waste-gas into the bunker 19 being arranged between the waste-gas duct 17 and the bunker 19 in the present illustrative embodiment. After the waste gas has flowed in a zig-zag-shaped counter flow from bottom to top through the bunker, the gas leaves the bunker 19 through a waste-gas removal line 25 in an upper area.

As the waste gas flows through the bunker 19, the cullet mixture 20 is preheated to a temperature of up to 380° C. During this process, the waste gas is cooled down to a temperature of far below 100° C.

The cooled waste gas emergin through the waste-gas supply line 25 from the bunker 19 subsequently reaches a wet scrubber 26 as is also shown in FIG. 2. In this scrubber, the waste gas, entering from below, is sprayed from above, that is to say also in counter flow, with a washing fluid 27 for removing or condensing the impurities accumulating in the waste gas during the preheating of the cullet mixture 20. After the purification, the waste gas finally emerges at the top from the wet scrubber 26 from where it is returned to the waste-gas duct 17 via a connecting line 28. This creates a closed waste-gas circuit.

The washing fluid 27 in the wet scrubber 26 is also conducted in a closed circuit. For this purpose, the washing fluid 27, which is enriched with pollutants from the waste gas and which accumulates at the bottom in the wet scrubber 16, first reaches a recirculation collecting tank 29 used for neutralizing the washing fluid 27. Neutralizing agents for example milk of lime and/or ammonia are continuously or intermittently supplied to this tank. After neutralization or purification of the washing fluid 27 in the recirculating collecting tank 29, the washing fluid 27 returns through a supply line 30 from the top into the wet scrubber 26 for repeated spraying of the waste gases. The substances removed from the washing fluide 27 during the purification or neutralization are removed as neutralized sludge, for example gypsum, from the recirculating collecting tank 29 through a discharging valve 31 located at the bottom.

Figure 3:
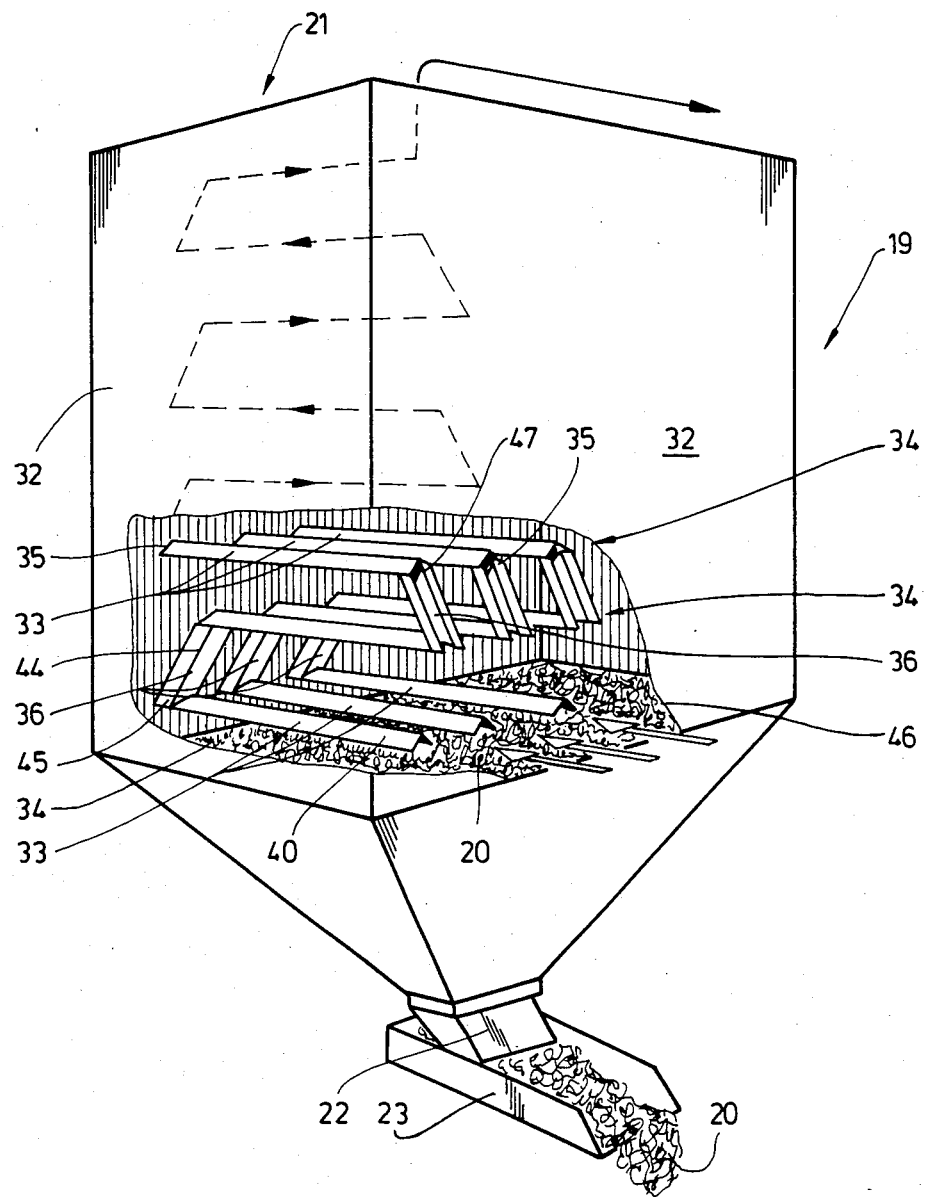
FIG. 3 shows a perspective view of a bunker in partial section, which is partially filled with a cullet mixture.

The construction of an illustrative embodiment of the bunker 19 can be seen in FIG. 3. In this case, the bunker 19 has a square cross-section formed of four vertical side walls 32. In its lower area, the bunker 19 narrows in the shape of a hopper towards the outlet 22 which also has a square cross-section in this illustrative embodiment. At the top, the bunker 19 can be completely open for forming the large-area opening 21.

Figure 5:
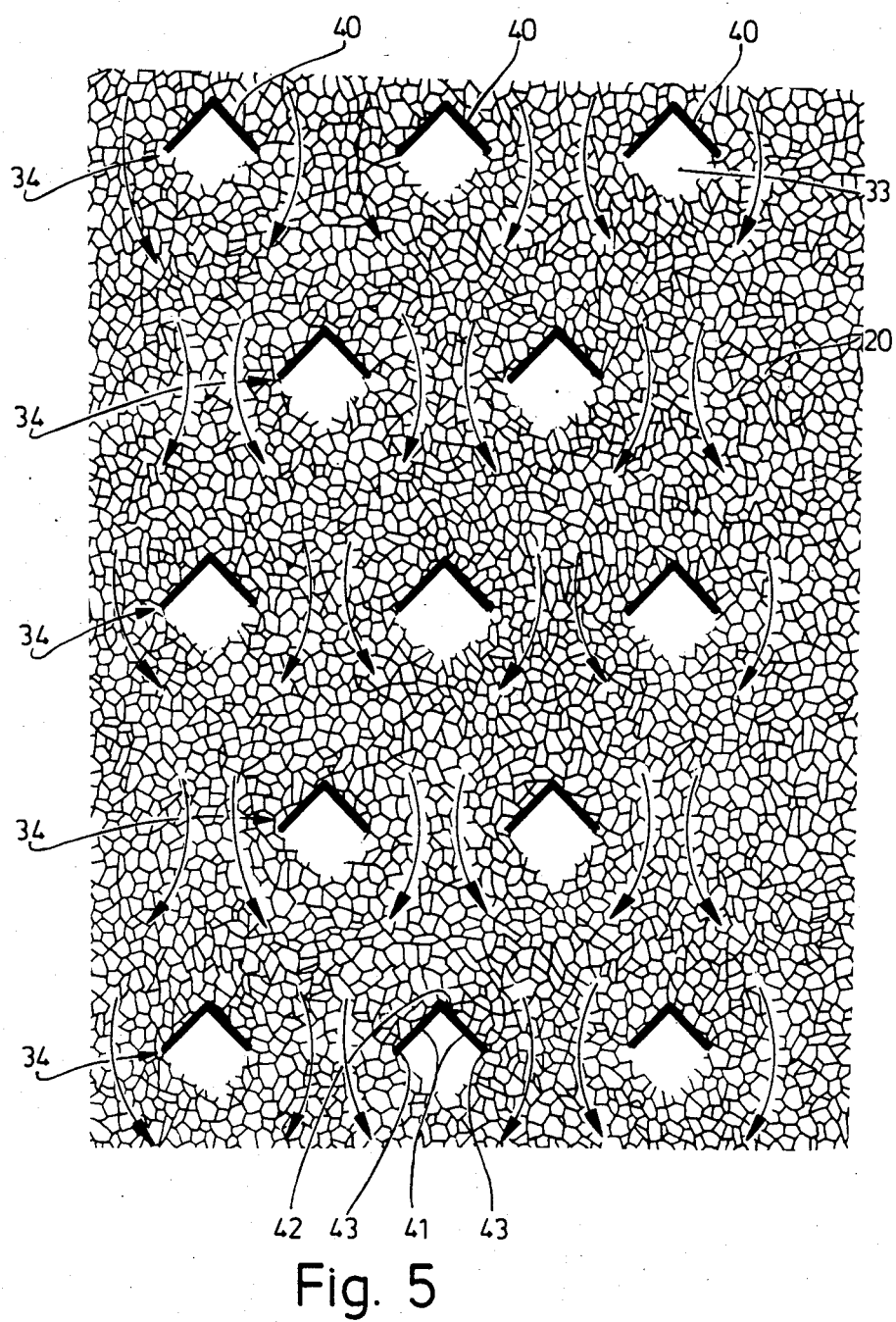
FIG. 5 shows a vertical part-section through the bunker completely filled with cullet.

A large number of horizontal flow ducts 33 is located in the main section of the bunker 19 which is formed by the vertical side walls 32. In the present illustrative embodiment, eight duct levels 34 of three flow ducts 33 each located at a distance in parallel adjacently to each other are arranged in the bunker 19. As is clearly shown in FIG. 5, the individual successive duct levels 34 are offset with respect to each other, in each case by half the distance between two adjacent flow ducts 33 on the duct level. As a result, the individual flow ducts 33 are approximately uniformly distributed staggered in the interior of the bunke, 19. The flow duct 33 are joined on their opposite ends 35 from one duct level 34 to the next by one overflow duct 36 in each case. Thus, the waste gases run storey-by-storey via the overflow ducts 36 from one flow duct 33 to the higher flow duct 33 in each case of another duct level 34.

Figure 4:
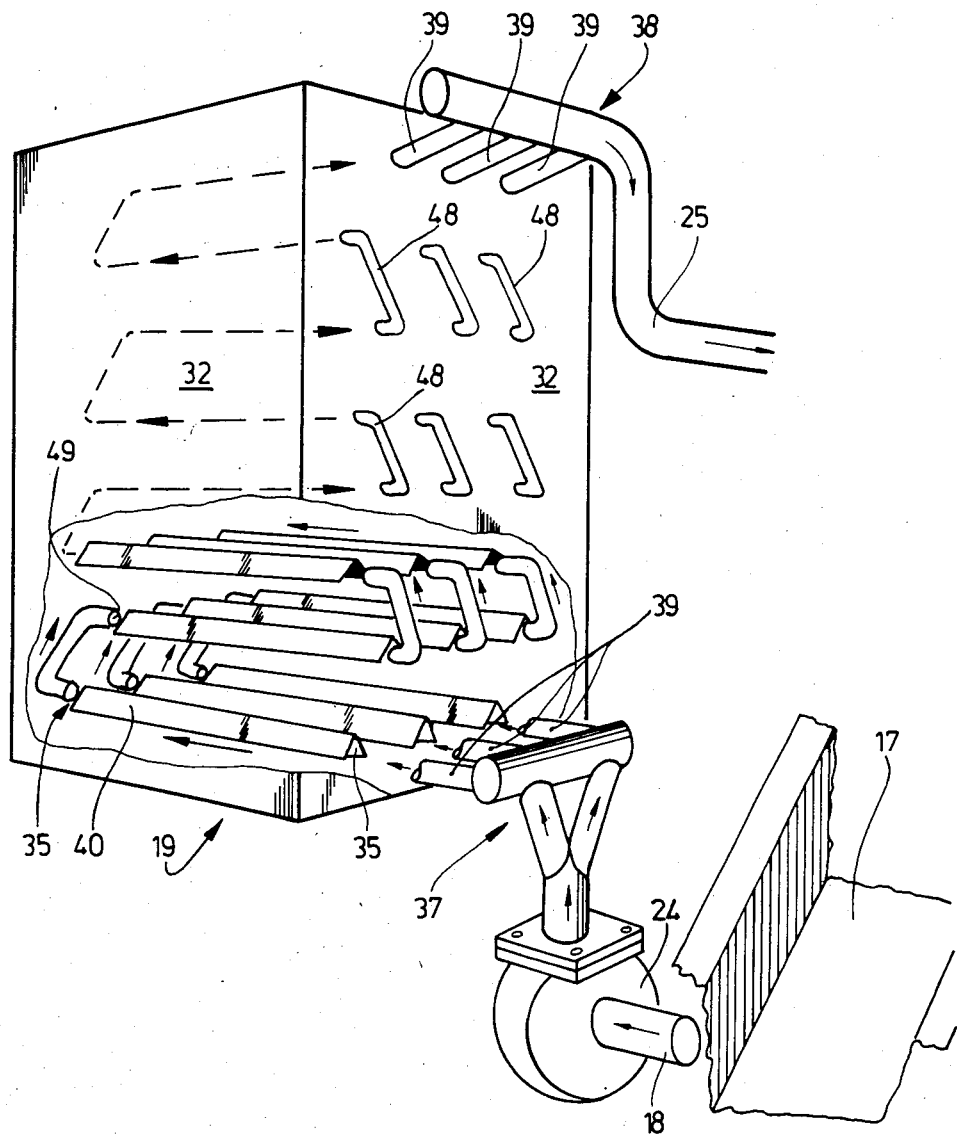
FIG. 4 shows a perspective view of a second illustrative embodiment of a bunker.

Each of the three flow ducts 33 of the lower duct level 34 is directly supplied with hot waste gases from the waste-gas supply line 18 at an end 35. For this purpose, the waste-gas supply line 18 has a triple brance 37 in front of its opening in the bunker 19, as is shown in FIG. 4. The waste-gas removal line 25, associated with the upper duct level 34, also has a branch 38 which is connected to one end of the three topmost flow ducts 33 in the bunker 19. As a result, three idependent vertically positioned waste-gas circuits 39 are formed in the bunker 19 in the present illustrative embodiment.

In the present illustrative embodiment, each flow duct 33 is of approximately the same construction, that is to say constructed in particularly simple manner of an elongated equal-sided angle section 40. The arrangement of the angle section 40 for the flow ducts 33 is effected in the bunker 19 in such a manner that the two sides 41 are located approximately at the same angle, that is to say approximately 45° C., with the apex edge 42 being located at the top. As a result, the two parallel lower free edges 43 of the sides 41 are approximately located in a horizontal plane. The angle sections 40 of the individual flow ducts 33 thus form a roof for the cullet mixture 20 in the bunker 19. As a result, a cone forms in the loose cullet mixture 20 below the angle section 40 and forms the second half of the flow ducts 33. As is clearly shown in FIG. 5, the flow ducts 33 have an approximately rhomboid cross section. In the uppper half, this is created by the internal cross-section of an angle section 40 and in the lower half it is created by the cone of the loose cullet mixture 20. In this manner, the (lower) half of the boundary surface of each flow duct 33 is directly formed by the cullet mixture 20.

In the illustrative embodiment of FIG. 3, the overflow ducts 36 are also formed from section material, that is to say from a U-section 44. In each case, this is arranged between two approximately opposite flow ducts 33, the open sides being directed towards the side walls 32 of the bunker 19 which are directed towards the ends 35 of the flow ducts 33. As a result, one side wall 32 of the bunker 19 in each case forms the fourth wall of the overflow duct which has a rectangular cross-section.

The gas enters in different manner from these overflow ducts 36, arranged in the interior of the bunker 19, to the open ends 35 of the flow ducts 33. The U-sections 44 of the overflow ducts 36, which are carried from below to the angle section 40, open directly below the angle sections 40 whose end 35 is on this side directly attached to the inside of the associated side wall 32 of the bunker 19. In contrast, the opposite end 35 of the angle section 40 is associated with the web 45 of the U-section 44 of the overflow ducts 36, that is to say not directly with a side wall 32. Corresponding to the inside cross-section of the angle section 40, triangular cutouts 46 are arranged, starting from the lower end of the overflow ducts 36 extending upwards, that is to say in the web 45, for matching the transitions of the flow ducts 33 to the overflow ducts 36, which extend upwards, with the cross-section of the flow ducts 33. A similar-cutout 47 can also be arranged in the upper end of the overflow duct 36 opening below the angle section 40.

The second illustrative embodiment of the bunker 19, shown in FIG. 4, only differs from the illustrative embodiment previously described in the configuration of the overflow ducts 48. This is because they are not arranged inside the bunker 19 but outside of it. For this purpose, the angle sections 40 for the flow ducts 33 are in this illustrative embodiment arranged between two opposite side walls 32 in the bunker 19. The overflow ducts 48 located outside the bunker 19 consists of tubes which are bent in a U-shape and which are associated with gas passage openings 49, correspondingly associated with the flow ducts 33 in the bunker 19, in the side walls 32.

Figure 6:
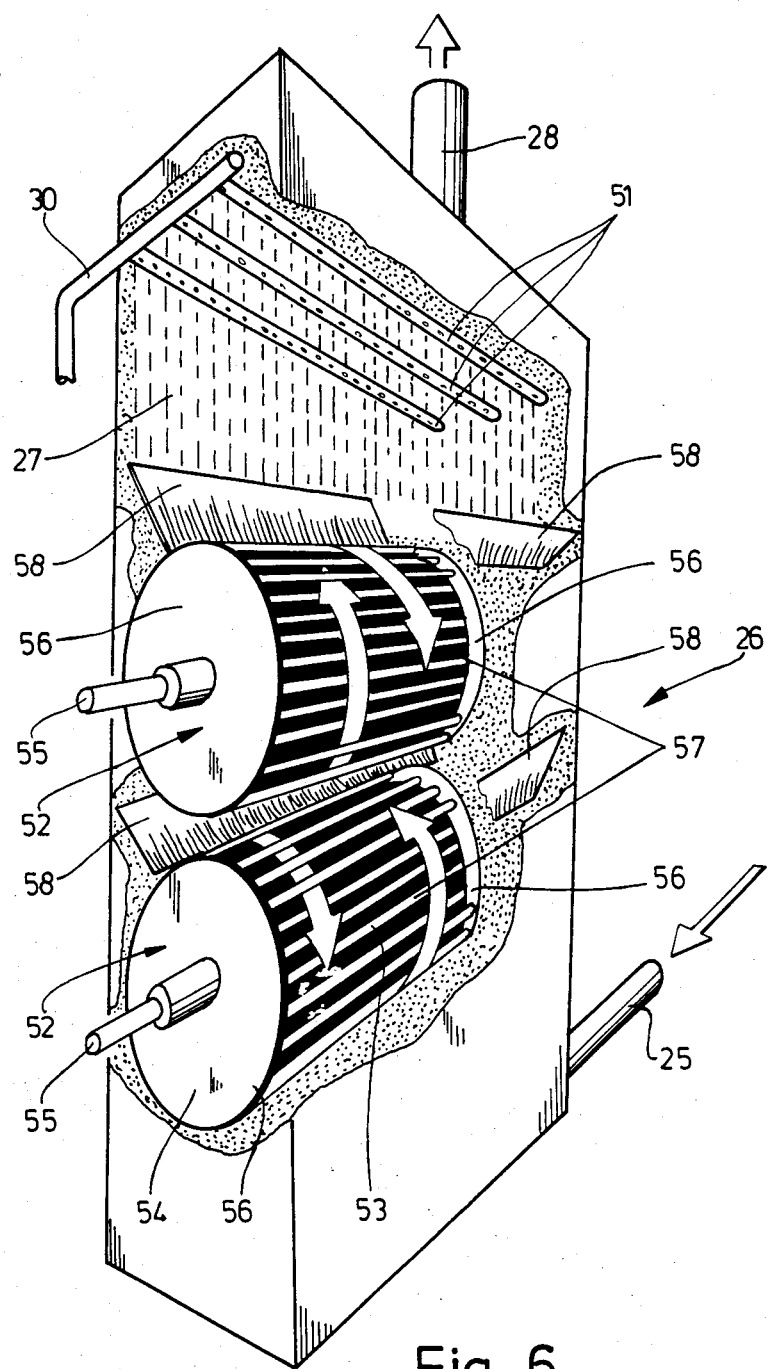
FIG. 6 shows a perspective view of a wet scrubber in partial section.

FIG. 6 clearly shows the configuration of the wet scrubber 26. Accordingly, the scrubber has an elongated upright housing 50 of rectangular cross section. At the top of the housing 50, three longitudinally extended horizontal pipes are located which have a great number of lower nozzles 51 for generating a veil of fluid, uniformly distributed over the cross-section of the housing 50, of washing fluid 27. In the centre area of the wet scrubber 26, two disintegrators 52, located on top of each other, are arranged inside the housing 50. Each of the two disintegrators 52 consists of two cylindrical drums of different sizes, located inside each other, these being a smaller inner drum 53 and a larger outer drum 54. Both drums 53, 54 rotate around a common horizontal axis of rotation 55, but in opposite directions. The two drums 53 and 54 are constructed in basically identical manner of two circular drum bottoms 56, arranged at a distance, the durm surface of which is formed by a large number of longitudinally directed rod 57 located at a distance from each other. The rods 57 can be non-uniformly distributed over the circumference of the drums 53, 54, as shown in FIG. 6, so that the circumference of the drums 53 and/or 54 remains partially free.

The drive for the drums 53 and 54 is not shown in the FIGS. This is suitably arranged outside the housing 50 of the wet scrubber 26. In this arrangement, either each drum 53 and 54 can be associated with its drive motor or, alternatively, the drive can be effected from a single drive motor which must then be associated with a corresponding transmission.

In the present illustrative embodiment, the outer drums 54 of the two disintegrators 52 are in each case associated with the two opposite obliquely-directed combs 58 which are preferably of flexible construction and engage the outer circumference of the disintegrators 52. These combs 58 are intended, on the one hand, to direct the washing fluid 27 onto the disintegrators and, on the other hand, to clean the disintegrators at the same time.

At the lower end, the housing 50 of the wet scrubber 26 has a hopper-like narrowing at which a supply line 59 for washing fluid 27, which collects at the bottom in the wet scrubber 26, is arranged. The washing fluid 27 reaches the recirculating collecting tank 29 via this supply line 59. In its lower area, this tank also has a hopper-shaped narrowing which is associated with two outlet openings, on the one hand a lateral outlet opening 60 for the supply line 30 of the purified washing fluid 27 to the wet scrubber 26 and a lower outlet opening 61 leading to the discharge valve 31 arranged below the recirculating collecting tank 29. In the present illustrative embodiment, a pump 62 or similar is arranged in the supply line 30 of the washing fluid 27 coming from the recirculating collecting tank 29 to the wet scrubber 26. This pump 62 conveys the washing fluid 27 in the upright closed circuit.

I claim:

1. A method for preheating a cullet mixture used for glass production and stored in a bunker (19), comprising: first, passing exhaust gas from a glass melting furnace (10) through a heat exchanger (13) to preheat fresh combustion air for the glass melting furnace (10); and, then, via a plurality of flow ducts (33) connected in flow-communication with one another, flowing the exhaust gas from the heat exchanger through the cullet mixture (20) in the bunker (19) to cause the residual heat in the exhaust gas to preheat the cullet mixture (20); and, to raise the temperature in the bunker (19), mixing exhaust gas coming directly from the glass melting furnace (10) with the exhaust gas exiting the heat exchanger.

2. A method as claimed in claim 1, wherein the waste gas flows through the cullet mixture (20) in the bunker (19) in a cross-counter flow through a plurality of flow ducts (33) which are joined to each other.

3. A method as claimed in claim 1 wherein the waste gas is introduced into the bunker (19) at about 400° C. to 600° C. and is conducted out of the bunker (19) at less than 100° C.

4. A method as claimed in claim 1, the waste gas emerging from the bunker (19) at a temperature of below 100° C. is condensed and/or cleaned, particularly by a wet scrubber (26).

5. A method as claimed in claim 4 wherein the waste gas is sprayed with washing fluid (27) in counter flow in the wet scrubber (26) with the washing fluid (27) being introduced into the wet scrubber (26) from the top and the waste gas being introduced into the latter from the bottom.

6. A method as claimed in claim 5 wherein the cleaning of the waste gases in the wet scrubber (26) is activated by at least one mechanical mixing element, particularly a disintegrator (52).

7. A method as claimed in claim 5 wherein chemical means, particularly neutralizing agents such as milk of lime and/or ammonia are added to the washing fluid (27) in the wet scrubber (26) for neutralizing the acids (sulfuric acid and so fourth) formed in the washing fluid (27) from the pollutants removed from the waste gas.

8. A method as claimed in claim 5 wherein the washing fluid (27) is conducted through the wet scrubber (27) in a closed circuit.

9. A method as claimed in claim 8 wherein the washing fluid (27) is conducted in a circuit through a recirculating collecting tank (29) from which the (neutralization) sludge is decanted and drained.

10. A device for preheating cullet (20) used for glass production and stored in a bunker (19), comprising:
a plurality of flow ducts (33) arranged in the bunker (19);
horizontal groups of adjacent paralle flow ducts (33) lying alongside one another in several vertically-spaced duct levels (34);
the flow ducts (33) in adjacent duct levels (34) being offset with respect to each other;
the same number of flow ducts (33) being in each duct level (34); and
wherein an upper half of each duct (33) is formed as an equal-sided angle section (40) whose apex edge (42) is directed upward, and
front sides of the angle sections (40) being affixed to opposite side walls (32) of the bunker (19); and
an overflow duct (36, 48) interconnecting each duct (33) in a level (34) with a corresponding duct (33) in an adjacent level (44), each overflow duct (36, 48) being assigned to the front side of the corresponding flow duct (33) directed toward the same side wall (32) of the bunker (19).

11. A device as claimed in claim 10 wherein each angle angle section (40) has two sides (41) with two free edges (43), lying in a horizontal plane, in the bunker (19), and wherein a half of the flow ducts (33) is formed from a cone of the loose cullet mixture (20) forming under each angle section (40).

12. A device as claimed in claim 11 wherein the angle sections (40) of the flow ducts (33) are permanently arranged in horizontal position, on the hand, at a side wall (32) of the bunker (19) and, on the other hand, at an overflow duct (36) which leads upwards on the inside of the bunker (19).

13. A device as claimed in claim 12 wherein the overflow ducts (36) are formed from a U-section (44) which is mounted obliquely with the open side on the inside at the corresponding side wall (32) of the bunker (19), in which arrangement the open ends (35) of the U-section (44) open in each case into a flow duct (33) of two different duct levels (34).

14. A device as claimed in claim 12 wherein the angle sections (40) of the flow ducts (33) are permanently arranged horizontally between two opposite perpendicular side walls (32) of the bunker (19) and the overflow ducts (48) are arranged between two flow ducts (33) of different duct levels (34) on the outside at the side walls (32) of the bunker (19), in which arrangement in each case a gas passage opening (49) is arranged between a flow duct (33) and an overflow duct (48) in the corresponding side walls (32) of the bunker (19).

15. A device as claimed in claim 10 wherein a wastegas supply line (18), which branches away from a wastegas duct (17) of the glass melting furnace (10), is extended to the bunker (19) and has a brance (37) which leads through appropriate openings in a side wall (32) of the bunker (19) to each flow duct (33) of the lower duct level (34).

16. A device as claimed in claim 10 wherein a waste gas removal line (25) has a branch (38) which has an opening for each flow duct (33) of the upper duct level (34).

17. A device as claimed in claim 16 wherein at least one disintegrator (52) is arranged in the wet scrubber (26), this disintegrator consisting of two cylindrical cages (drum 53; 54) of different diameter, which are arranged inside each other and rotate in opposite directions like a ventilator around a central horizontal axis of rotation (55) and which have rods (57) which are uniformly arranged at a distance at the circumference of these cages and extend parallel to the axis of rotation (55), and are permanently joined in groups to one pair of circular drum bottoms (56) each arranged at the ends.

18. A device as claimed in claim 17 wherein each disintegrator (52) is associated at its external circumference with at least two (elastic) combs (58).

19. A device as claimed in claim 16 wherein a recirculating collecting tank (29) is arranged below the wet scrubber (26) in the circuit of the washing fluid (27).

20. A device as claimed in claim 19 wherein a discharge valve (31) for draining the (neutralization) sludge precipitated in the recirculating collecting tank (29) is arranged below this tank.

* * * * *